(12) United States Patent
Chen (10) Patent No.: US 11,317,772 B2
(45) Date of Patent: May 3, 2022

(54) WORKING TROLLEY WITH BUILT-IN DUST SUCTION SYSTEM

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

( * ) Notice: Subject to any disclaimer, the term of this patent is extended or adjusted under 35 U.S.C. 154(b) by 346 days.

(21) Appl. No.: 16/740,745

(22) Filed: Jan. 13, 2020

(65) Prior Publication Data

US 2021/0212531 A1 Jul. 15, 2021

(51) Int. Cl.
| | |
|---|---|
| *A47L 7/00* | (2006.01) |
| *A47L 9/00* | (2006.01) |
| *A47L 9/12* | (2006.01) |
| *A47L 9/16* | (2006.01) |
| *A47L 9/28* | (2006.01) |
| *B04C 5/185* | (2006.01) |
| *B04C 9/00* | (2006.01) |
| *B01D 45/16* | (2006.01) |
| *B25H 1/04* | (2006.01) |
| *B01D 50/20* | (2022.01) |
| *B23Q 11/00* | (2006.01) |

(52) U.S. Cl.
CPC ........... *A47L 7/0095* (2013.01); *A47L 7/0047* (2013.01); *A47L 9/009* (2013.01); *A47L 9/127* (2013.01); *A47L 9/165* (2013.01); *A47L 9/1608* (2013.01); *A47L 9/1658* (2013.01); *A47L 9/1683* (2013.01); *A47L 9/28* (2013.01); *B01D 45/16* (2013.01); *B01D 50/20* (2022.01); *B04C 5/185* (2013.01); *B04C 9/00* (2013.01); *B25H 1/04* (2013.01); *B04C 2009/002* (2013.01); *B23Q 11/0046* (2013.01)

(58) Field of Classification Search
CPC ...... A47L 7/0095; A47L 7/0047; A47L 9/009; A47L 9/127; A47L 9/1608; A47L 9/165; A47L 9/1658; A47L 9/1683; A47L 9/28; B01D 50/20; B01D 45/16; B04C 5/185; B04C 9/00; B04C 2009/002; B23Q 11/0046
See application file for complete search history.

(56) References Cited

FOREIGN PATENT DOCUMENTS

CN 207786208 U 8/2018

*Primary Examiner* — Andrew A Horton
(74) *Attorney, Agent, or Firm* — Muncy, Geissler, Olds & Lowe, PC (57) ABSTRACT

A working trolley with built-in dust suction system includes a dust suction system and a trolley. Through directly assembling the dust suction system with the trolley, useless structures in the dust suction system is eliminated, so that the dust suction system can be assembled with the trolley with a more simplified structure. Through directly assembling the dust suction system with the trolley, the trolley breaks the old and stereotyped way of using, and the trolley is no longer just a carrying tool of a vacuum cleaner, thereby greatly increasing the effectiveness of usage of the trolley. On the other hand, the present invention enables a dust storage bucket of the dust suction system to have a feature of being independently dismountable, so that an operator does not need to dismount other components when replacing the dust storage bucket, thereby facilitating operation for the operator.

18 Claims, 7 Drawing Sheets

WORKING TROLLEY WITH BUILT-IN DUST SUCTION SYSTEM

FIELD OF THE INVENTION

The present invention relates to a working trolley, and more particularly to a working trolley with built-in dust suction system.

BACKGROUND OF THE INVENTION

When cutting, sanding, and polishing materials such as sheet metal, stone, glass fiber, and materials for woodworking as well as building and decoration, machine tools such as cutting tool, sander, and polisher are often used. Taking sander as an example, when the sanding process is performed, the rotation sander with the coarsest sanding particle size must first be used, and then orbital sander with the medium sanding particle size is used, and finally random orbital sander with finest sanding particle size. The fineness of sanding consumables also varies from the coarsest #24, #60, #100 to the finest #1000, #2000, #5000. In addition, for the different materials of objects to be sanded, the materials used for sanding consumables are also different. Therefore, the operator prepares various machine tools and consumables at the same time in the work zone, and a working trolley for placing various machine tools and consumables becomes a necessary device. Further, when the aforementioned processes are performed, a large amount of dust will inevitably be raised in the air, thereby jeopardizing the health of the operator. Therefore, the existing working trolleys are often equipped with a vacuum cleaner and the like to allow the operator to enhance the convenience of work and maintain his health at the same time during the sanding process.

The existing working trolleys can be roughly categorized into the following types according to their structural configurations. One type is to directly install wheels on the bottom of the vacuum cleaner, another type is to place the vacuum cleaner on the working trolley, and the other type is the internal system of the vacuum cleaner is directly combined with the working trolley. First, the type of working trolley with wheels directly installed on the bottom of the vacuum cleaner is explained, which is disclosed in "Mobile dust extractor CTL 48 E AC CLEANTEX", "Mobile Vacuum Cleaner CTM 26 E", and "WCR 1000 WORK CENTRE" from FESTOOL; "Dust Extractor 1025 L PC 230V" from MIRKA; and "Mobile Cleaner KS260EN" from RUPES. Although this type of working trolley provides technical teaching of the movable vacuum cleaner, the power cord, compressed air pipe, dust suction pipe, housing and vacuum cleaner must be disassembled one by one when replacing the dust collection bucket for these working trolleys, so that the vacuum cleaner can be opened to replace the dust collection bucket. Furthermore, this type of working trolley is not provided with a work platform, which is inconvenient for the operator to place machine tools during operation.

On the other hand, the type of having the vacuum cleaner placed directly on the working trolley can be found in China patent number CN 207786208U, "Trolley for dust extractor" from MIRKA, and "Multipurpose Trolley for Professional Vacuum Cleaners" from RUPES. According to the foregoing disclosure, it can be found that for this type of working trolley having the vacuum cleaner placed on the working trolley, the dust suction system is obviously not fully integrated with the working trolley. Because both the vacuum cleaner and the working trolley have their own housings and other structures, when the vacuum cleaner is put away on the working trolley, only the housing of the working trolley can protect the internal devices, and the housing of the vacuum cleaner can not provide such function, as a result, not only that the housing of the vacuum cleaner is installed without providing protection for the internal devices, but also the cost of the working trolley is increased. Moreover, similarly, the vacuum cleaner must be disassembled from the working trolley first when replacing the dust collection bucket for this type of working trolley, and then the structures on the vacuum cleaner must be disassembled sequentially in order to take the dust collection bucket out. Similarly, this also makes it inconvenient for the operator to replace the dust collection bucket.

SUMMARY OF THE INVENTION

A main object of the present invention is to solve the problems of the conventional technology that the dust suction system is not fully integrated with the working trolley and is incapable of disassembling the dust collection bucket independently.

In order to achieve the above object, the present invention provides a working trolley with built-in dust suction system including a dust suction system and a trolley body. The dust suction system includes a cyclonic dust separation device, an exhaust motor, an air pipe connected to the cyclonic dust separation device and the exhaust motor, and a dust storage bucket. The trolley body includes a frame, an assembly space defined by the frame, and a supporting plate provided in the assembly space and connected to the frame. The supporting plate divides the assembly space into a top zone and a bottom zone, the supporting plate comprises a through hole, and the top zone is provided for disposing the cyclonic dust separation device and the exhaust motor. A dust discharge outlet of the cyclonic dust separation device is disposed corresponding to the through hole. The bottom zone is provided for disposing the dust storage bucket, and the dust storage bucket is suspended on a side of the supporting plate facing the bottom zone and can be taken out from the trolley body independently.

In one embodiment, the air pipe is formed by a passage provided on a side of the supporting plate facing the top zone.

In one embodiment, the dust suction system includes a power supply module which is disposed in the top zone or the bottom zone and is at least electrically connected to the exhaust motor.

In one embodiment, the trolley body includes a working platform provided on a top of the frame.

In one embodiment, the trolley body includes a plurality of first exterior plates disposed corresponding to the top zone respectively.

In one embodiment, at least one of the working platform or the plurality of first exterior plates is provided with a plurality of ventilation holes.

In one embodiment, one of the plurality of first exterior plates is provided with a power supply socket for plugging an external device.

In one embodiment, the trolley body includes at least one storage drawer disposed in the bottom zone.

In one embodiment, the dust suction system includes a high-efficiency particulate air (HEPA) filter disposed between the cyclonic dust separation device and the exhaust motor, and a filtration efficiency of the high-efficiency particulate air filter is above 90%.

In addition to the foregoing, the present invention further provides a working trolley with built-in dust suction system including a dust suction system and a trolley body. The dust suction system includes a cyclonic dust separation device, an exhaust motor, an air pipe connected to the cyclonic dust separation device and the exhaust motor, and a dust storage bucket. The trolley body includes a frame, an assembly space defined by the frame, and a supporting plate provided in the assembly space and connected to the frame. The supporting plate divides the assembly space into a top zone and a bottom zone, the supporting plate comprises an air hole communicating with the air pipe, and a through hole, and the top zone is provided for disposing the cyclonic dust separation device. A dust discharge outlet of the cyclonic dust separation device is disposed corresponding to the through hole. The bottom zone is provided for disposing the exhaust motor and the dust storage bucket, the exhaust motor and the dust storage bucket are respectively suspended on a side of the supporting plate facing the bottom zone, the exhaust motor corresponds to the air hole, the dust storage bucket corresponds to the through hole and can be taken out from the trolley body independently.

In one embodiment, the air pipe is provided on a side of the supporting plate facing the top zone, and the air pipe communicates with the exhaust motor and the air hole respectively.

In one embodiment, the dust suction system includes a power supply module which is selectivity disposed in the top zone or the bottom zone, and the power supply module is at least electrically connected to the exhaust motor.

In one embodiment, the trolley body includes a working platform provided on a top of the frame.

In one embodiment, the trolley body includes a plurality of first exterior plates disposed corresponding to the top zone respectively, and a plurality of second exterior plates disposed corresponding to the bottom zone respectively.

In one embodiment, at least one of the working platform or the plurality of second exterior plates is provided with a plurality of ventilation holes.

In one embodiment, one of the plurality of first exterior plates is provided with a power supply socket for plugging an external device.

In one embodiment, the trolley body includes at least one storage drawer disposed in the bottom zone and disposed separately from the exhaust motor.

In one embodiment, the dust suction system includes a high-efficiency particulate air (HEPA) filter that communicates with the air pipe and is located in front of the exhaust motor, and a filtration efficiency of the high-efficiency particulate air filter is above 90%.

According to the foregoing description, compared with the prior art, the present invention has the following features: the present invention breaks the usage habit of the conventional working trolleys, so that the dust suction system can be directly assembled in the assembly space. Compared with the prior art, the present invention enables the working trolley to achieve greater effectiveness of usage, rather than merely as a carrying tool of a vacuum cleaner. In addition, the dust storage bucket of the present invention is directly suspended from the side of the supporting plate facing the bottom zone and can be independently taken out from the trolley. Compared with the prior art, the present invention does not need to dismount the structures on the working trolley when disassembling the dust storage bucket, so that the dust storage bucket has the feature of convenient disassembly.

DETAILED DESCRIPTION OF THE PREFERRED EMBODIMENTS

The detailed description and technical contents of the present invention are described below with reference to the drawings.

Figure 1:
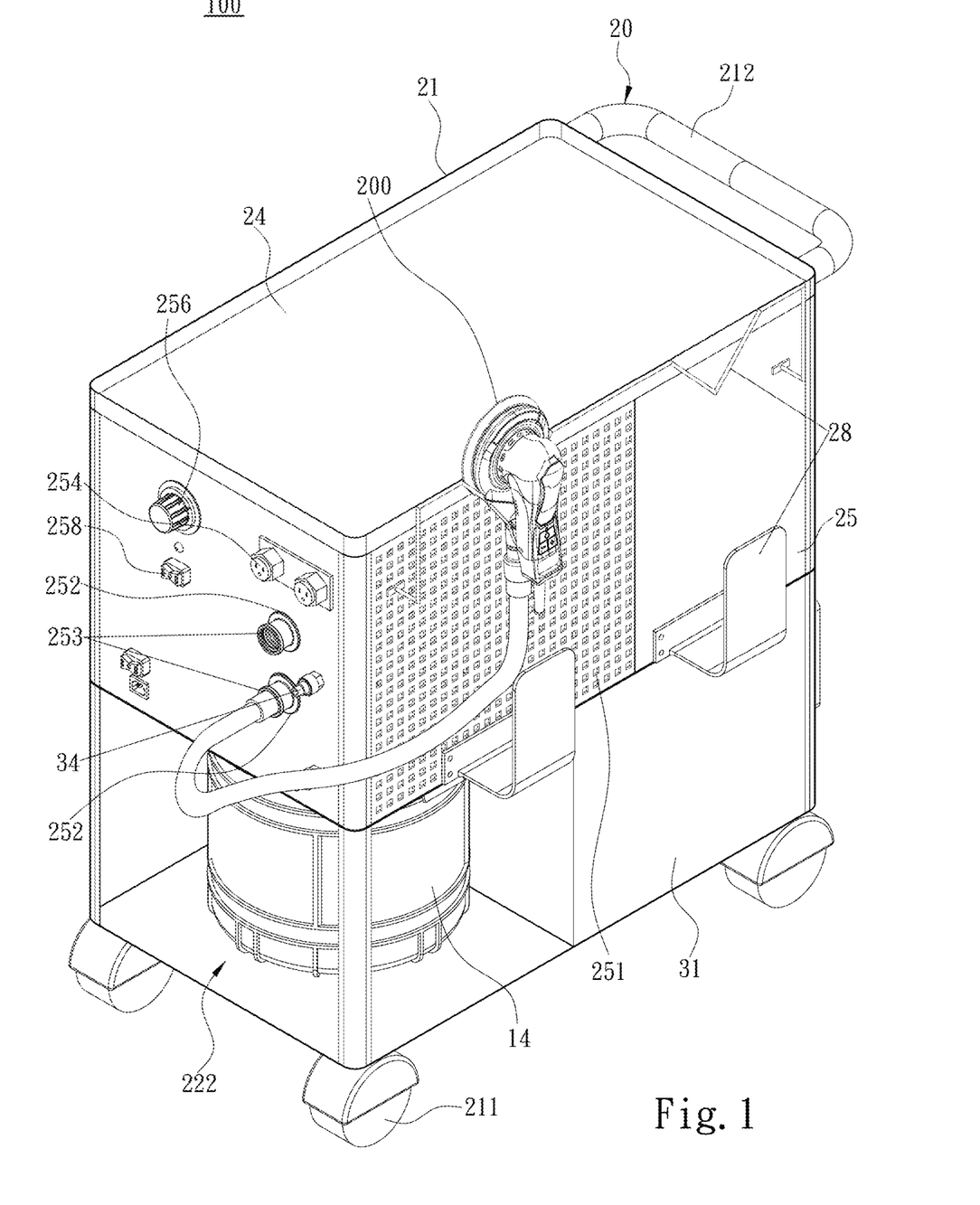
FIG. 1 is a structural perspective view of a first embodiment of the present invention.

In the following, the terms "first" and "second" used in the elements are intended to distinguish the elements and are not intended to limit the order of the elements. In addition, the following spatial relative terms such as "top end", "bottom edge", "upward" and "downward" are based on the directions in which the figures are drawn. It is understandable that these spatial relative terms can be changed as changes are made to the directions in which the figures are drawn, for example, once the FIG. 1 is drawn horizontally, the original "top end" and "bottom edge" will be changed to "left" and "right" respectively.

Please refer to FIG. 1, FIG. 2, FIG. 3, FIG. 4, and FIG. 5. The present invention provides a working trolley 100 with built-in dust suction system. The working trolley 100 includes a dust suction system 10 and a trolley body 20. The dust suction system 10 includes a cyclonic dust separation device 11, an exhaust motor 12, an air pipe 13 and a dust storage bucket 14. Specifically, the cyclonic dust separation device 11 communicates with the exhaust motor 12 through the air pipe 13, and the cyclonic dust separation device 11 comprises an air inlet 111 communicating with the outside. The cyclonic dust separation device 11 is operated by the exhaust motor 12 when the exhaust motor 12 is activated, and the air inlet 111 sucks in a airflow to be filtered 70, thereby causing the airflow to be filtered 70 to enters the dust suction system 10 for dust separation. In addition, the exhaust motor 12 used in the present invention is a motor that can be used in both wet and dry environments. Therefore, the airflow to be filtered 70 drawn by the cyclonic dust separation device 11 can be a humid air or an air containing less moisture (commonly known as dry air). In one embodiment, the exhaust motor 12 includes an electric motor 121 and an air bucket 122 connected to the electric motor 121. When the electric motor 121 starts, air is drawn into the air bucket 122 from an air inlet side 123 and is transformed into a high-pressure airflow 74 by the action of the air bucket 122, and then the high-pressure airflow 74 is discharged toward a direction facing the electric motor 121 to dissipate heat from the electric motor 121 at the same time. In addition, in order to stably assemble the exhaust motor 12 with the trolley body 20, the exhaust motor 12 includes at least one auxiliary support rod 124 connected to the air bucket 122, and each auxiliary support rod 124 is located at an outer side of the exhaust motor 12 to fix the exhaust motor 12 on the trolley body 20. Besides, the air pipe 13 includes an air inlet end 131 connected to the cyclonic dust separation device 11, and an air outlet end 132 connected to the air inlet side 123 of the exhaust motor 12. The air inlet end 131 receives the airflow discharged by the cyclonic dust separation device 11 and causes the airflow located in the air pipe 13 to flow from the air outlet end 132 toward the air inlet side 123 of the exhaust motor 12, which will be described in detail later. In addition, the dust storage bucket 14 is disposed below the cyclonic dust separation device 11, and the dust storage bucket 14 is used to receive a dust 80 filtered out from the airflow to be filtered 70 by the cyclonic dust separation device 11.

Further, the trolley body 20 of the present invention is provided for the dust suction system 10 to dispose therein. The trolley body 20 comprises a frame 21, an assembly space 22 defined by the frame 21, and a supporting plate 23 disposed in the assembly space 22 and connected to the frame 21. The frame 21 includes a plurality of wheels 211 respectively disposed on a bottom thereof, and a trolley handle 212. In addition, the supporting plate 23 is disposed in the assembly space 22 horizontally, thereby the supporting plate 23 divides the assembly space 22 into a top zone 221 and a bottom zone 222. The top zone 221 is provided for disposing the cyclonic dust separation device 11 and the exhaust motor 12, and the bottom zone 222 is provided for disposing the dust storage bucket 14. A height of the top zone 221 and a height of the bottom zone 222 can be adjusted according to sizes of the internal devices. Further, the supporting plate 23 comprises a through hole 231, a side of the through hole 231 facing the top zone 221 is disposed corresponding to a dust discharge outlet 112 of the cyclonic dust separation device 11, and a side of the through hole 231 facing the bottom zone 222 is disposed corresponding to an opening 141 of the dust storage bucket 14. That is, the through hole 231 is used to communicate the cyclonic dust separation device 11 with the dust storage bucket 14.

Figure 3:
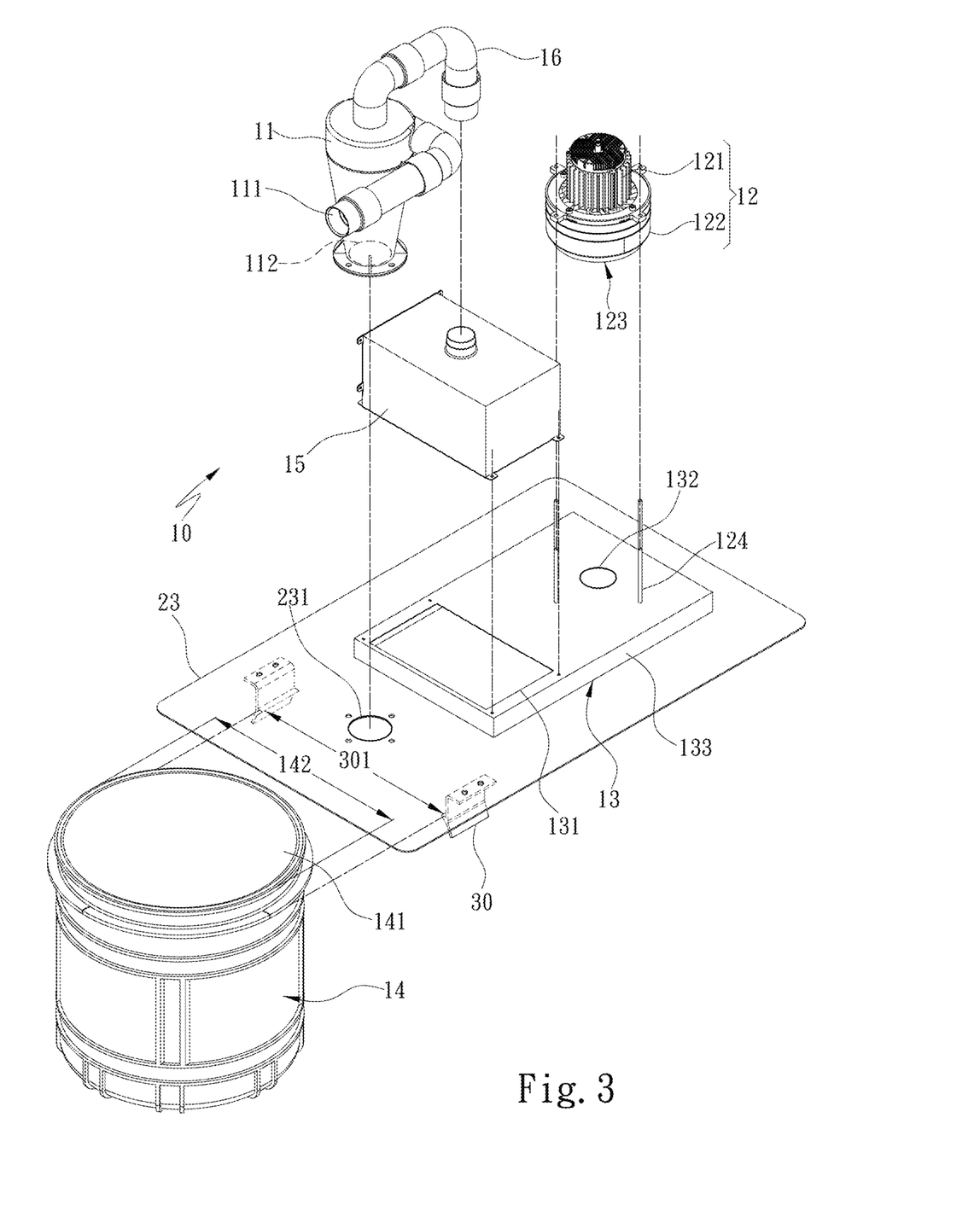
FIG. 3 is a perspective exploded view of a part of components of the first embodiment of the present invention.
Figure 4:
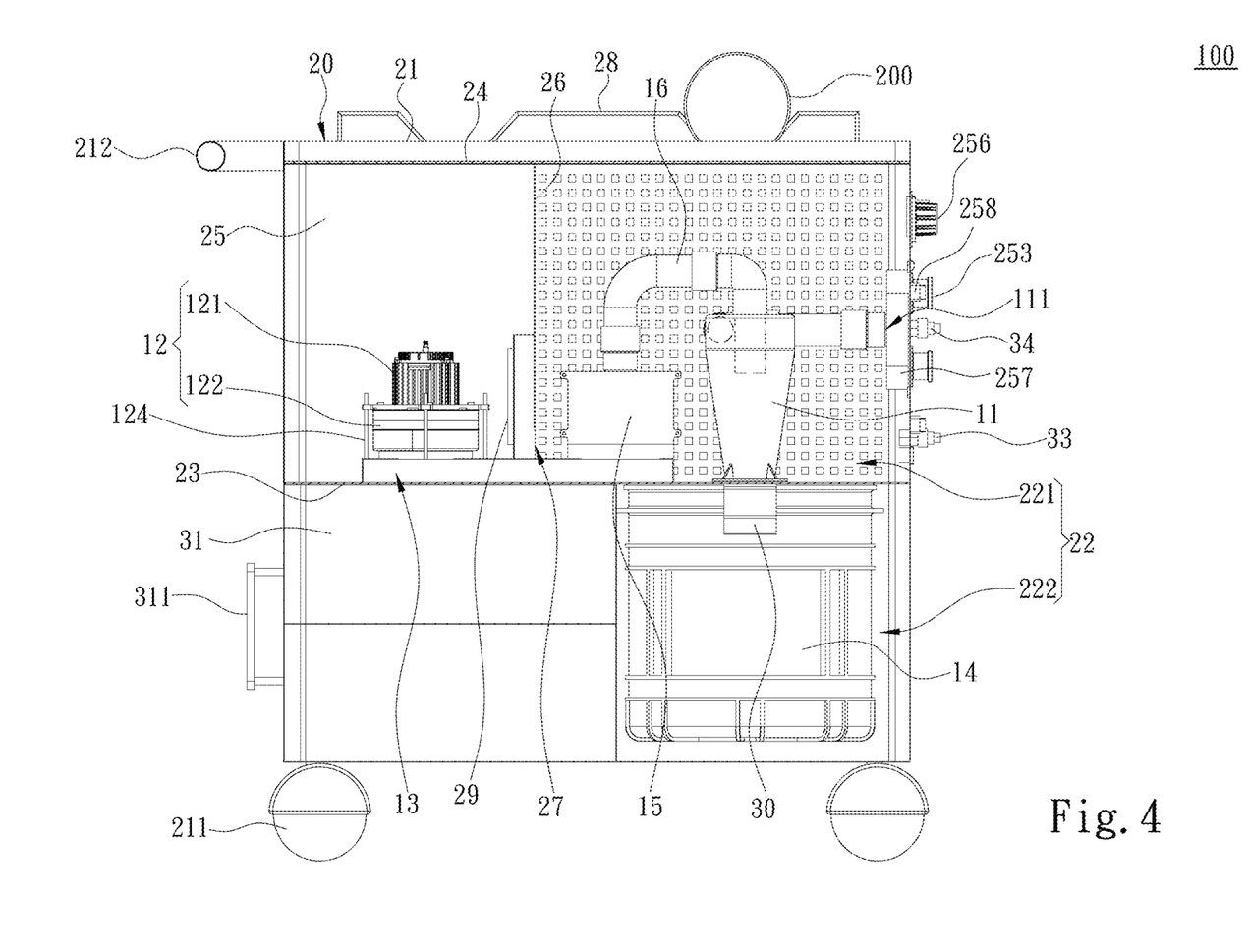
FIG. 4 is a structural cross-sectional view of the first embodiment of present invention.
Figure 5:
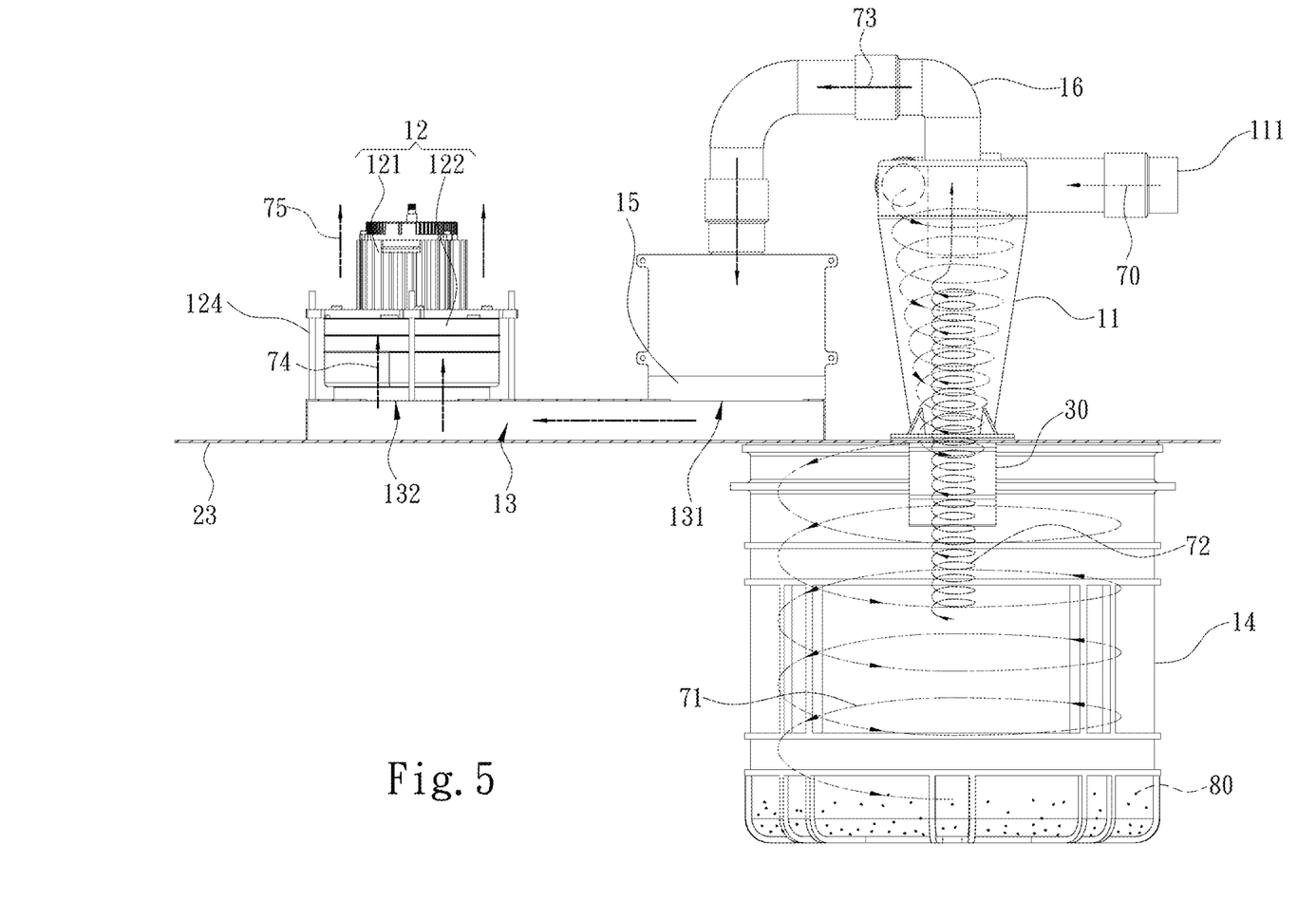
FIG. 5 is a schematic diagram of airflow during the implementation of the first embodiment of the present invention.

Please refer to FIG. 3, FIG. 4, and FIG. 5, the implementation of the working trolley 100 is described hereunder. First, assuming that the working trolley 100 of the present invention has not started the operation at the beginning, that is, the exhaust motor 12 is turned off. When the exhaust motor 12 is controlled and starts to operate, the exhaust motor 12 draws the airflow to be filtered 70 containing the dust 80 from the outside through the cyclonic dust separation device 11. After the airflow to be filtered 70 enters the cyclonic dust separation device 11 from the air inlet 111, the airflow to be filtered 70 forms a descending swirl 71 along an inner wall of the cyclonic dust separation device 11. Since a pipe diameter of the cyclonic dust separation device 11 is tapered, a rotational speed of the descending swirl 71 is gradually increased during the descending process, and the dust 80 is displaced to an outer edge of the descending swirl 71 by centrifugation. Thereafter, the dust 80 displaces along the inner wall of the cyclonic dust separation device 11 along with the descending swirl 71 toward a direction facing the dust storage bucket 14 through the through hole 231. Then, when the descending swirl 71 displaces to a position inside the dust storage bucket 14, since an inner diameter of the dust storage bucket 14 is larger than an inner diameter of the cyclonic dust separation device 11, a rotational speed of the descending swirl 71 decreases, so that the dust 80 sinks into the dust storage bucket 14 due to centrifugation, and at the same time, the descending swirl 71 is transformed into an ascending swirl 72 by the action of the exhaust motor 12.

Thereafter, the ascending swirl 72 continues to be displaced toward a direction facing the exhaust motor 12 and becomes a relatively clean dust-separated airflow 73. The dust-separated airflow 73 enters the air bucket 122 of the exhaust motor 12 along the air pipe 13, and the dust-separated airflow 73 is pressurized by the air bucket 122 to transform into the high-pressure airflow 74. The high-pressure airflow 74 is guided by the air bucket 122 to flow toward a direction facing the electric motor 121, so that the high-pressure airflow 74 is discharged outside of the air bucket 122 and is transformed into a heat-dissipation airflow 75, and the heat-dissipation airflow 75 dissipates heat of the electric motor 121 while discharging from the exhaust motor 12.

Therefore, compared with the prior art, the present invention breaks the old and stereotyped way of usage of the conventional working trolley, that is, the dust suction system 10 is directly combined with the trolley body 20, so that the dust suction system 10 of the present invention has a more simplified structure. In addition, the dust storage bucket 14 of the present invention has a feature of being independently dismountable, so that an operator does not need to dismount other components when replacing the dust storage bucket 14, thereby facilitating replacement for the operator. In addition, the working trolley 100 of the present invention is used with a machine tool 200 during implementation. The machine tool 200 can be an electric machine tool (not shown in the figures) or a pneumatic machine tool (not shown in the figures). In addition, when the machine tool 200 is used as the pneumatic machine tool, the working trolley 100 is externally connected with an air pump (not shown in the figures). Through an air source inlet 33 disposed on the trolley body 20, and an air supply outlet 34 on the trolley body 20 connected to the pneumatic machine tool, the air pump serves as a power source of the pneumatic machine tool.

Please refer to FIG. 3, FIG. 4, and FIG. 5. In one embodiment, the air pipe 13 of the present invention is formed by a passage 133 provided on a side of the supporting plate 23 facing the top zone 221. Two ends of the passage 133 are respectively connected to the cyclonic dust separation device 11 and the exhaust motor 12. The passage 133 receives the dust-separated airflow 73 discharged from the cyclonic dust separation device 11 and the passage 133 guides the dust-separated airflow 73 to flow toward the exhaust motor 12. In one embodiment, the dust suction system 10 includes a high-efficiency particulate air (HEPA) filter 15 disposed between the cyclonic dust separation device 11 and the exhaust motor 12. The high-efficiency particulate air filter 15 communicates with the passage 133 and is located in front of the exhaust motor 12. The high-efficiency particle air filter 15 receives the dust-separated airflow 73 discharged from the cyclonic dust separation device 11, intercepts the fine dust 80 contained in the dust-separated airflow 73, and filters the dust-separated airflow 73 passing through the high-efficiency particulate air filter 15 to be cleaner. In one embodiment, a filtration efficiency of the high-efficiency particulate air filter 15 is above 90%. Further, the dust suction system 10 further includes an air duct 16 connecting the high-efficiency particulate air filter 15 and the cyclonic dust separation device 11.

Please refer to FIG. 2, FIG. 3, FIG. 4, and FIG. 5, in one embodiment, the trolley body 20 comprises a working platform 24 provided on a top of the frame 21, and a plurality of first exterior plates 25 disposed corresponding to the top zone 221. The working platform 24 is provided for the operator to perform sanding thereon. The first exterior plates 25 are connected to the working platform 24. The first exterior plates 25 and the working platform 24 collectively shield the cyclonic dust separation device 11 and the exhaust motor 12. In one embodiment, at least one of the plurality of first exterior plates 25 is provided with at least one exterior plate handle 255 for the operator to operate with. The exterior plate handle 255 allows the operator to selectively close or release the top zone 221. In addition, at least one of the first exterior plates 25 can be provided with at least one hinge (not shown in the figures), and the hinge allows at least one of the plurality of first exterior plates 25 to be open or close by turning pivotally relative to the trolley body 20. Further, the trolley body 20 comprises a partition plate 26 disposed in the top zone 221 and used to separate the exhaust motor 12 and the cyclonic dust separation device 11, and an airflow passage 27 formed on the partition plate 26. At least one of the working platform 24 or the plurality of first exterior plates 25 is provided with a plurality of ventilation holes 251. The plurality of ventilation holes 251 communicate with the airflow passage 27, and the plurality of ventilation holes 251 are provided for the heat-dissipation airflow 75 discharged from the exhaust motor 12 to flow into the top zone 221 which corresponds to the plurality of ventilation holes 251 through the airflow passage 27, and then the heat-dissipation airflow 75 is discharged outside of the trolley body 20 through the plurality of ventilation holes 251. In addition, at least one operation knob 256 for controlling a rotational speed of the exhaust motor 12 is provided on one of the plurality of first exterior plates 25.

Furthermore, in one embodiment, the trolley body 20 comprises at least one hook member 28 provided on at least one of the plurality of first exterior plates 25, and the hook member 28 is used for hanging a dust suction pipe of the machine tool 200. In addition, in another embodiment, one of the plurality of first exterior plates 25 is provided with at least one dust suction pipe connection seat 252, and the dust suction pipe connection seat 252 is provided for disposing an air pipe joint 253 connected to the air inlet 111. During implementation, the dust suction pipe connection seat 252 allows the airflow to be filtered 70 to flow into the cyclonic dust separation device 11 from the air pipe joint 253, and then the airflow to be filtered 70 is entered into the cyclonic dust separation device 11 to perform dust filtering operation. Further, if a quantity of the dust suction pipe connection seat 252 is more than one, in order to allow the air pipe joint 253 provided on each of the dust suction pipe connection seats 252 being connected to the cyclonic dust separation device 11, the air pipe joints 253 respectively communicate with the cyclonic dust separation device 11 through a manifold 257.

Figure 6:
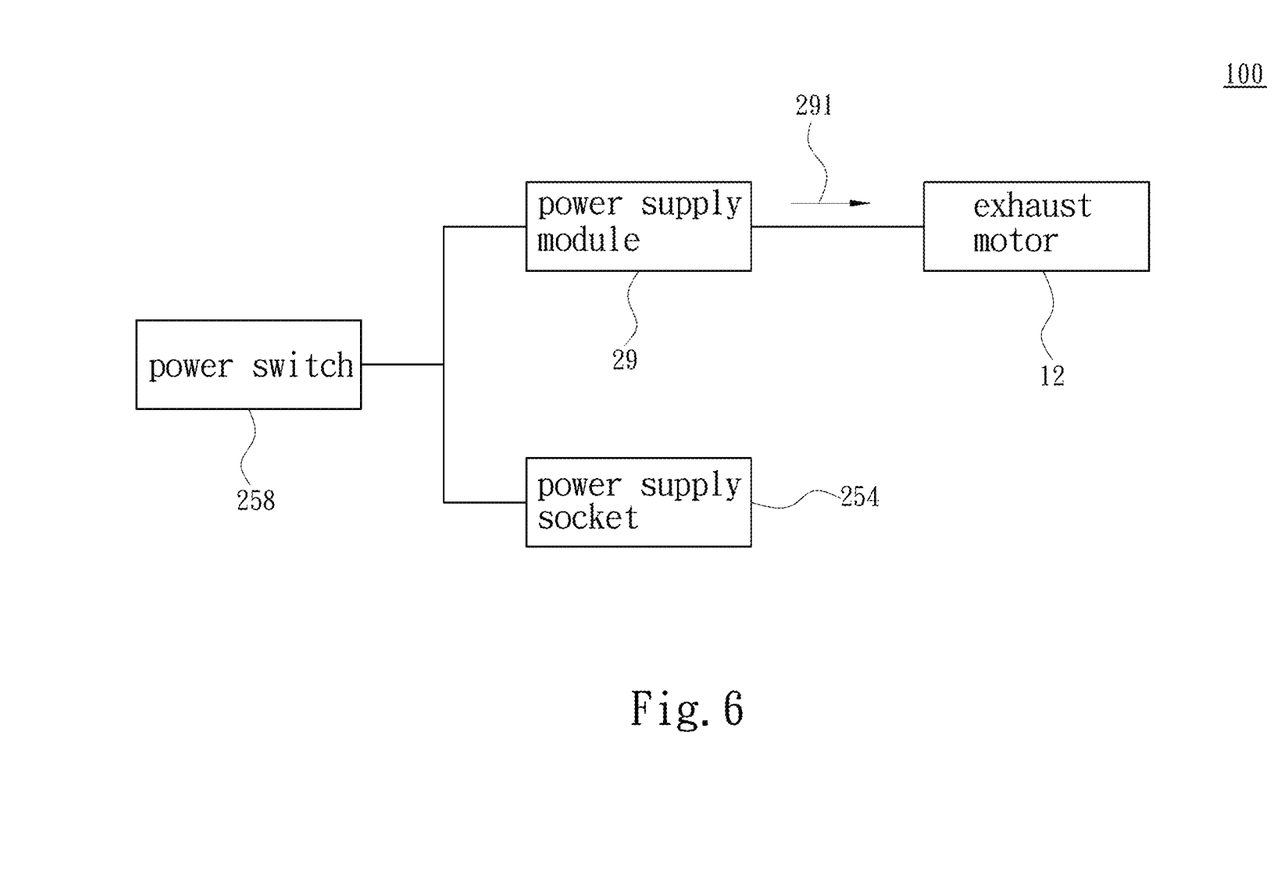
FIG. 6 is a block diagram of the first embodiment of the present invention.

On the other hand, please refer to FIG. 4, FIG. 5, and FIG. 6, in one embodiment, the dust suction system 10 includes a power supply module 29 which is at least electrically connected to the exhaust motor 12, and the power supply module 29 could be disposed in the top zone 221 or the bottom zone 222. Specifically, when the power supply module 29 is disposed in the top zone 221, the power supply module 29 is assembled on the partition plate 26, and the power supply module 29 transmits a working power 291 to the exhaust motor 12 after being operated, so that the exhaust motor 12 is operated after receiving the working power 291. In addition, when the power supply module 29 is disposed in the bottom zone 222, the supporting plate 23 is provided with at least one threading hole (not shown in the figures), and the threading hole is provided for a wire (not shown in the figures) of the power supply module 29 to pass from the bottom zone 222 through the top zone 221, so that the wire can be connected to the exhaust motor 12. Furthermore, one of the plurality of first exterior plates 25 is provided with a power switch 258 electrically connected to the power supply module 29. The power switch 258 is used to control power on and power off of the power supply module 29. In one embodiment, one of the plurality of first exterior plates 25 is further provided with a power supply socket 254 electrically connected to the power switch 258, and the power supply socket 254 is controlled by the power switch 258 and is provided for plugging an external device (not shown in the figures) in order to provide power for the external device.

Figure 2:
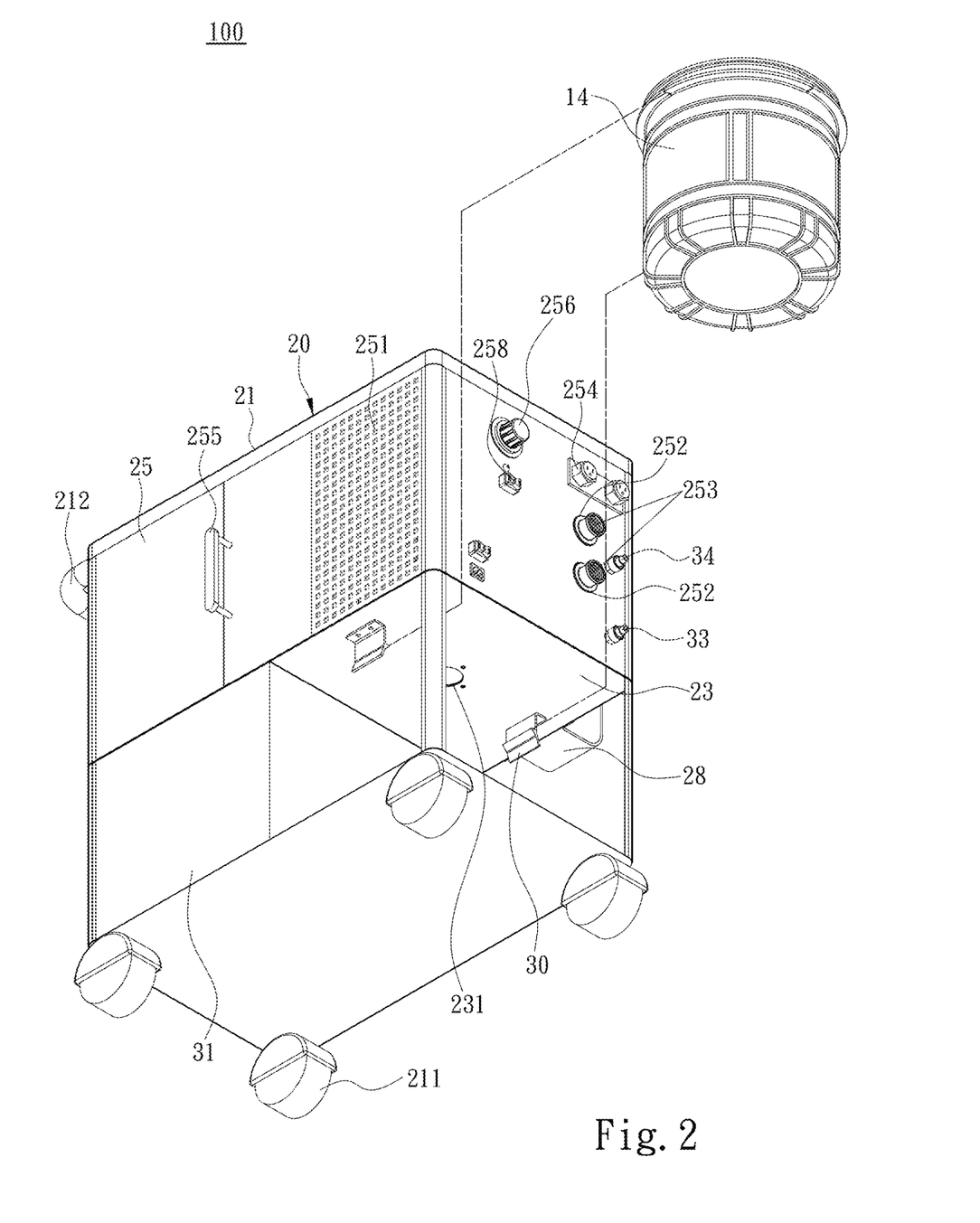
FIG. 2 is a perspective view of a removable dust storage bucket of the first embodiment of the present invention.

Please refer to FIG. 2, FIG. 3, and FIG. 4, in one embodiment, in order to suspend the dust storage bucket 14 on the supporting plate 23, the trolley body 20 comprises a plurality of hooks 30 disposed on a side of supporting plate 23 facing the bottom zone 222, the plurality of hooks 30 are used for hanging the dust storage bucket 14, and a distance 301 between the plurality of hooks 30 is set corresponding to an outer diameter 142 of the dust storage bucket 14, thereby the dust storage bucket 14 is assembled with the plurality of hooks 30 and hung on the supporting plate 23. Moreover, in the embodiment, the plurality of hooks 30 allow the dust storage bucket 14 to be placed in a space between the plurality of hooks 30 in a horizontal manner, and then the dust storage bucket 14 is assembled with the plurality of hooks 30. When the dust storage bucket 14 is intended to be taken out of the trolley body 20, the dust storage bucket 14 is easily removed from the trolley body 20 simply by displacing horizontally relative to the plurality of hooks 30. On the other hand, in one embodiment, the trolley body 20 comprises at least one storage drawer 31 disposed in the bottom zone 222. The storage drawer 31 is connected to the supporting plate 23 and is disposed corresponding to the dust storage bucket 14. Further, at least one drawer handle 311 is further provided on the storage drawer 31.

In addition to the foregoing embodiment, the present invention also provides the working trolley 100 according to another embodiment. The basic infrastructure of the working trolley 100 in this embodiment is the same as that of the working trolley 100 in the previous embodiment. The difference between the working trolley 100 in this embodiment and the working trolley 100 in the previous embodiment is that the exhaust motor 12 is disposed in a different way. In order to distinguish the two embodiments, the exhaust motor in this embodiment will be marked with a different numeral "17".

Figure 7:
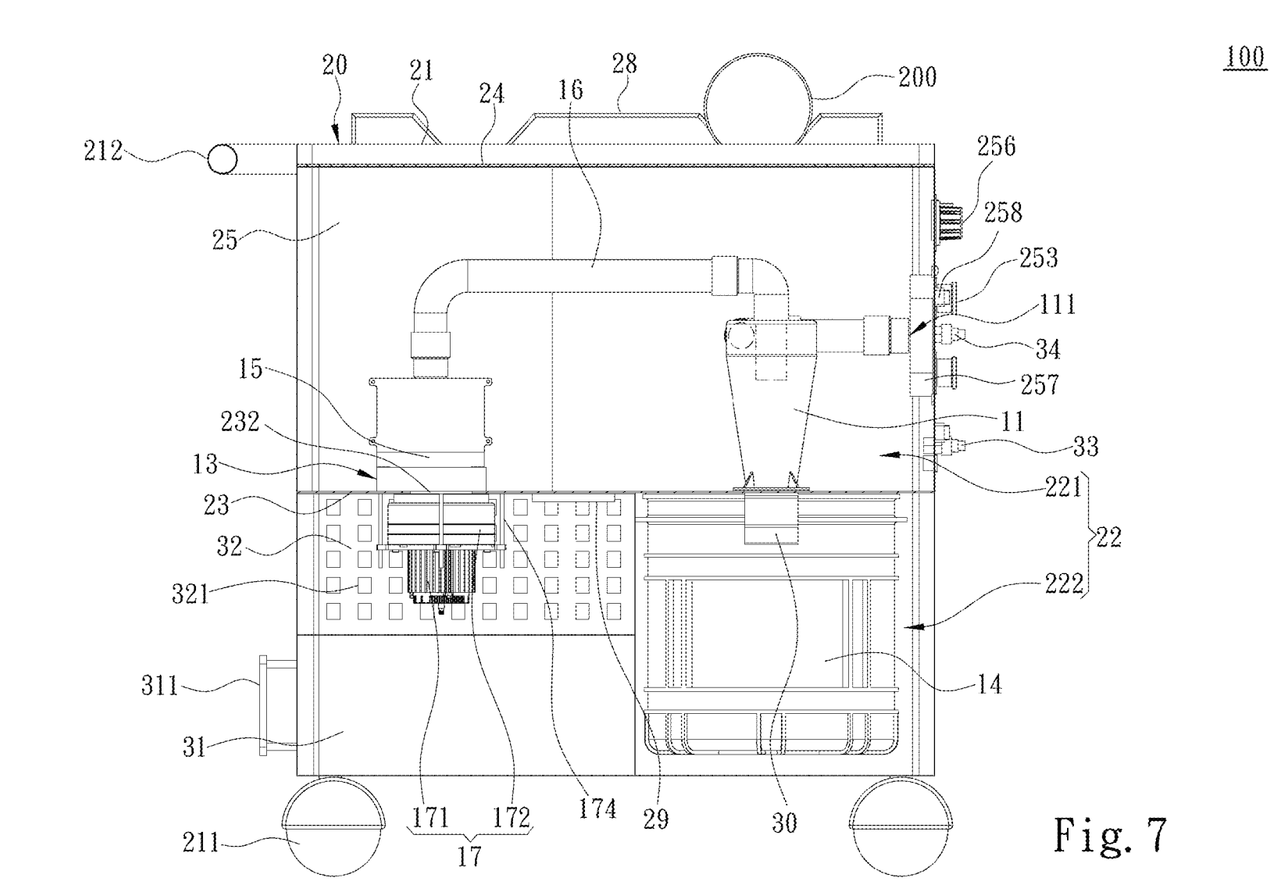
FIG. 7 is a structural cross-sectional view of a second embodiment of the present invention.

Please refer to FIG. 7, in one embodiment, an exhaust motor 17 is not disposed on the side of the supporting plate 23 facing the top zone 221, but is disposed in the bottom zone 222. Further, please refer to FIG. 3 and FIG. 5, in addition to the through hole 231, the supporting plate 23 further comprises an air hole 232 communicating with the air pipe 13, and the exhaust motor 17 is disposed corresponding to the air hole 232 in order to communicate with the high-efficiency particulate air filter 15. When the trolley body 20 is implemented, the exhaust motor 17 is operated to draw the airflow to be filtered 70 from the air inlet 111, the airflow to be filtered 70 is transformed into the dust-separated airflow 73 after the cyclonic dust separation device 11 filters out the dust 80, and the dust-separated airflow 73 enters the exhaust motor 17 through the air pipe 13 and the air hole 232. The dust-separated airflow 73 is pressurized after entering the exhaust motor 17, and finally the dust-separated airflow 73 is transformed into the heat-dissipation airflow 75 and discharged from the air bucket 122 toward a direction facing the electric motor 121.

In addition, in this embodiment, the power supply module 29 is electrically connected to the exhaust motor 17, and the power supply module 29 can be disposed in the top zone 221 or the bottom zone 222. For further illustration, the power supply module 29 is disposed on a side of the supporting plate 23 facing the bottom zone 222. On the other hand, please refer to FIG. 7, in one embodiment, in addition to the first exterior plates 25 provided corresponding to the top zone 221, the trolley body 20 further comprises a plurality of second exterior plates 32 provided corresponding to the bottom zone 222. The plurality of second exterior plates 32 do not cover the dust storage bucket 14 but only cover the exhaust motor 17, so that the dust storage bucket 14 is exposed to the outside and is convenient to take out. Further, in one embodiment, at least one of the working platform 24 or the plurality of second exterior plates 32 is provided with a plurality of ventilation holes 321, and the ventilation holes 321 are provided for the air discharged by the exhaust motor 17 to flow out of the trolley body 20. In addition, in the embodiment, the storage drawer 31 is also disposed in the bottom zone 222. Specifically, a position of the storage drawer 31 is below the exhaust motor 17 and is disposed separately from the exhaust motor 17.

What is claimed is:

1. A working trolley with built-in dust suction system, comprising:
   a dust suction system, including a cyclonic dust separation device, an exhaust motor, an air pipe connected to the cyclonic dust separation device and the exhaust motor, and a dust storage bucket; and
   a trolley body, including a frame, an assembly space defined by the frame, and a supporting plate provided in the assembly space and connected to the frame, the supporting plate dividing the assembly space into a top zone and a bottom zone, the supporting plate comprising a through hole, the top zone provided for disposing the cyclonic dust separation device and the exhaust motor, and a dust discharge outlet of the cyclonic dust separation device disposed corresponding to the through hole, the bottom zone provided for disposing the dust storage bucket, and the dust storage bucket suspended on a side of the supporting plate facing the bottom zone and capable of being taken out from the trolley body independently.

2. The working trolley with built-in dust suction system as claimed in claim 1, wherein the air pipe is formed by a passage provided on a side of the supporting plate facing the top zone.

3. The working trolley with built-in dust suction system as claimed in claim 1, wherein the dust suction system includes a power supply module which is selectivity disposed in the top zone or the bottom zone, and the power supply module is at least electrically connected to the exhaust motor.

4. The working trolley with built-in dust suction system as claimed in claim 1, wherein the trolley body including a working platform provided on a top of the frame.

5. The working trolley with built-in dust suction system as claimed in claim 4, wherein the trolley body including a plurality of first exterior plates disposed corresponding to the top zone respectively.

6. The working trolley with built-in dust suction system as claimed in claim 5, wherein at least one of the working platform or the plurality of first exterior plates is provided with a plurality of ventilation holes.

7. The working trolley with built-in dust suction system as claimed in claim 6, wherein one of the plurality of first exterior plates is provided with a power supply socket for plugging an external device.

8. The working trolley with built-in dust suction system as claimed in claim 4, wherein the trolley body comprises at least one storage drawer disposed in the bottom zone.

9. The working trolley with built-in dust suction system as claimed in claim 1, wherein the dust suction system includes a high-efficiency particulate air (HEPA) filter disposed between the cyclonic dust separation device and the exhaust motor, and a filtration efficiency of the high-efficiency particulate air filter is above 90%.

10. A working trolley with built-in dust suction system, comprising:
    a dust suction system, including a cyclonic dust separation device, an exhaust motor, an air pipe connected to the cyclonic dust separation device and the exhaust motor, and a dust storage bucket; and
    a trolley body, including a frame, an assembly space defined by the frame, and a supporting plate provided in the assembly space and connected to the frame, the supporting plate dividing the assembly space into a top zone and a bottom zone, the supporting plate comprising an air hole communicating with the air pipe, and a through hole, the top zone provided for disposing the cyclonic dust separation device, and a dust discharge outlet of the cyclonic dust separation device disposed corresponding to the through hole, the bottom zone provided for disposing the exhaust motor and the dust storage bucket, the exhaust motor and the dust storage bucket respectively suspended on a side of the supporting plate facing the bottom zone, the exhaust motor corresponding to the air hole, the dust storage bucket corresponding to the through hole and capable of being taken out from the trolley body independently.

11. The working trolley with built-in dust suction system as claimed in claim 10, wherein the air pipe is provided on a side of the supporting plate facing the top zone, and the air pipe communicates with the exhaust motor and the air hole respectively.

12. The working trolley with built-in dust suction system as claimed in claim 10, wherein the dust suction system includes a power supply module which is selectively disposed in the top zone or the bottom zone, and the power supply module is at least electrically connected to the exhaust motor.

13. The working trolley with built-in dust suction system as claimed in claim 10, wherein the trolley body including a working platform provided on a top of the frame.

14. The working trolley with built-in dust suction system as claimed in claim 13, wherein the trolley body including a plurality of first exterior plates disposed corresponding to the top zone respectively, and a plurality of second exterior plates disposed corresponding to the bottom zone respectively.

15. The working trolley with built-in dust suction system as claimed in claim 14, wherein at least one of the working platform or the plurality of second exterior plates is provided with a plurality of ventilation holes.

16. The working trolley with built-in dust suction system as claimed in claim 15, wherein one of the plurality of first exterior plates is provided with a power supply socket for plugging an external device.

17. The working trolley with built-in dust suction system as claimed in claim 10, wherein the trolley body including at least one storage drawer disposed in the bottom zone and disposed separately from the exhaust motor.

18. The working trolley with built-in dust suction system as claimed in claim 10, wherein the dust suction system includes a high-efficiency particulate air (HEPA) filter that communicates with the air pipe and is located in front of the exhaust motor, and a filtration efficiency of the high-efficiency particulate air filter is above 90%.

* * * * *